June 16, 1942.    A. J. SWANSON    2,286,516
AIRFOIL HINGE
Filed May 6, 1940    3 Sheets-Sheet 1

ALFRED J. SWANSON
INVENTOR.

BY
ATTORNEY.

June 16, 1942.    A. J. SWANSON    2,286,516
AIRFOIL HINGE
Filed May 6, 1940    3 Sheets-Sheet 2
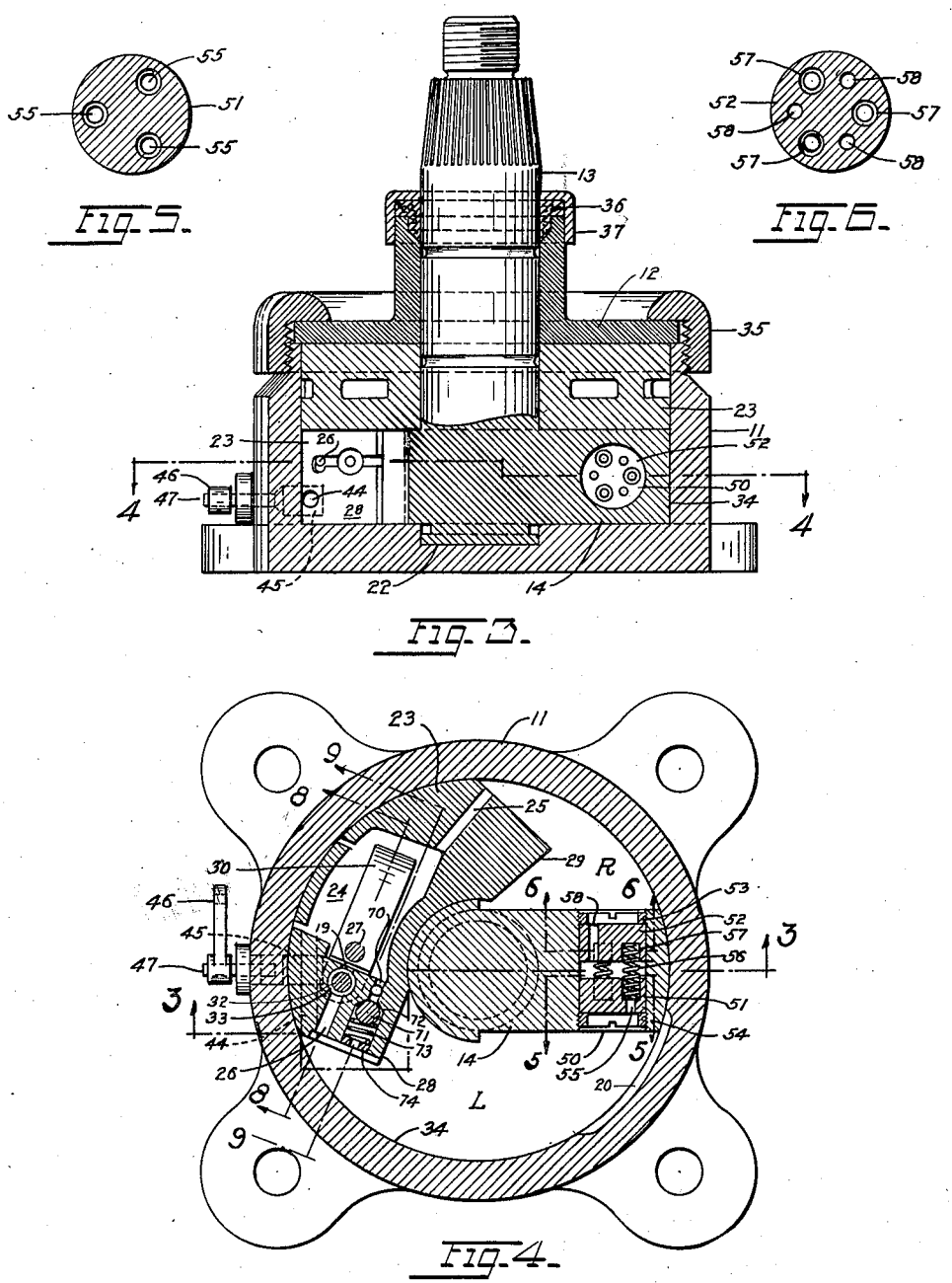
ALFRED J. SWANSON
INVENTOR.
BY Miner L. Hartmann
ATTORNEY June 16, 1942.  A. J. SWANSON  2,286,516
AIRFOIL HINGE
Filed May 6, 1940  3 Sheets-Sheet 3

ALFRED J. SWANSON
INVENTOR.

BY Miner L. Hartmann
ATTORNEY.

Patented June 16, 1942

2,286,516

UNITED STATES PATENT OFFICE 2,286,516

AIRFOIL HINGE

Alfred J. Swanson, Los Angeles, Calif.

Application May 6, 1940, Serial No. 333,514

14 Claims. (Cl. 188—93)

This invention relates to airfoil hinges, and in particular to a hinge which also prevents the flapping of ailerons and elevators of airplanes. The movable airfoil parts of airplanes, such as the ailerons, elevators, etc., are ordinarily attached to the nonmovable wing or body structures by hinging devices which permit these parts to move freely, the movable airfoils being manipulated during flight by levers manually or mechanically actuated. In the operation of airplanes, particularly at high speeds, difficulty and much danger to safe flying is caused by the vibration of hinged portions of the airfoil. During high speed flight, these airfoil members are often unexpectedly and unexplainably set into vibration or oscillation around the hinging axis, and if this oscillation is allowed to continue unrestrained, it may quickly result in the complete tearing off of an aileron or elevator, with disastrous consequences. Because these movable wind surfaces, such as ailerons and elevators must be freely adjustable for controlling the flying airplane, the introduction of ordinary friction devices or the usual dashpot type mechanisms fails to solve the problem. Their use introduces too much resistance to the required operating movement of the parts. No known device has heretofore prevented this dangerous and uncontrolled flapping, and at the same time permitted entire freedom of movement of the parts for operative movement.

There is practically no tendency to flapping when the plane is landing or taking off, nor during low speed flight, and since it is particularly desirable to have ailerons and elevators easily manipulatable during these operations it is desirable that any means which may be used to prevent flapping shall not interfere with the unrestrained movement of these hinged parts during taking off and landing, and if to prevent flapping during high-speed flight some restraint of movement is introduced, that the anti-flapping device may be instantly upon occasion made wholly inoperative, either manually or automatically, from the central control board or compartment.

In my invention, I employ a hinge device with a hydraulic checking mechanism which almost instantly stops any quick movement of the airfoil part, but which in no way interferes with the necessary slower movements required for manipulation of the plane in flight.

One object of my invention is to provide a hinge device which will prevent the flapping of ailerons and elevators during flight of airplanes. Another object is to provide a hinge device which prevents flapping of ailerons and elevators on airplanes but which does not interfere with the usual easy movement of these members for control purposes. Still another object is to provide a hinge check mechanism which introduces small resistance to steady turning in either direction, but which automatically introduces great resistance to quick acceleration of turning in either direction. Still another object is to provide in a hinge for movable airfoil members a damping mechanism which may be easily put completely into or out of effective operation from the control panel by the human pilot or by automatic pilot devices.

These and other objects of my invention will be apparent from the further description and the drawings, in which Fig. 1 is an elevation partly in section of one form of my device;

Fig. 3 is an elevation partly in cross-section showing another form of my hinge device;

Fig. 4 is a cross-sectional view taken in the line 4—4 of Fig. 3;

Fig. 5 is a sectional view taken on the line 5—5 of Fig. 4;

Fig. 6 is a sectional view of the piston taken on the line 6—6 of Fig. 4;

Figure 1:
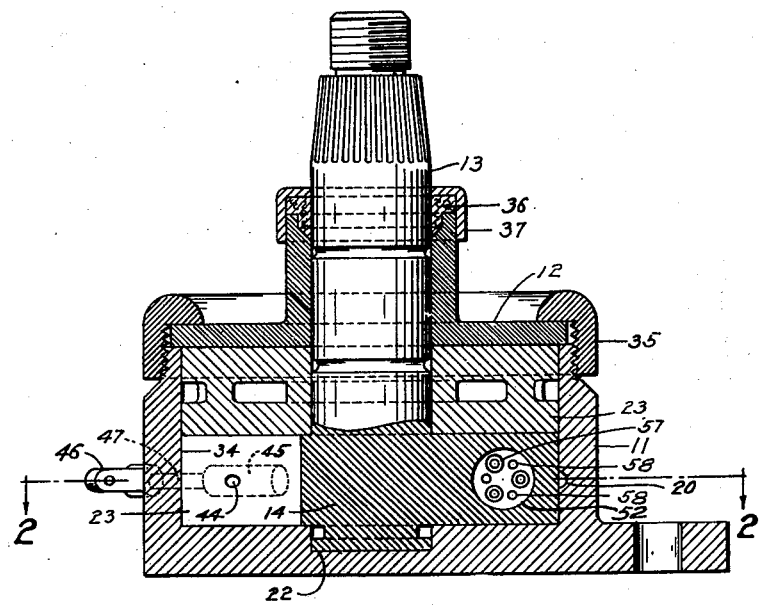
Figure 2:
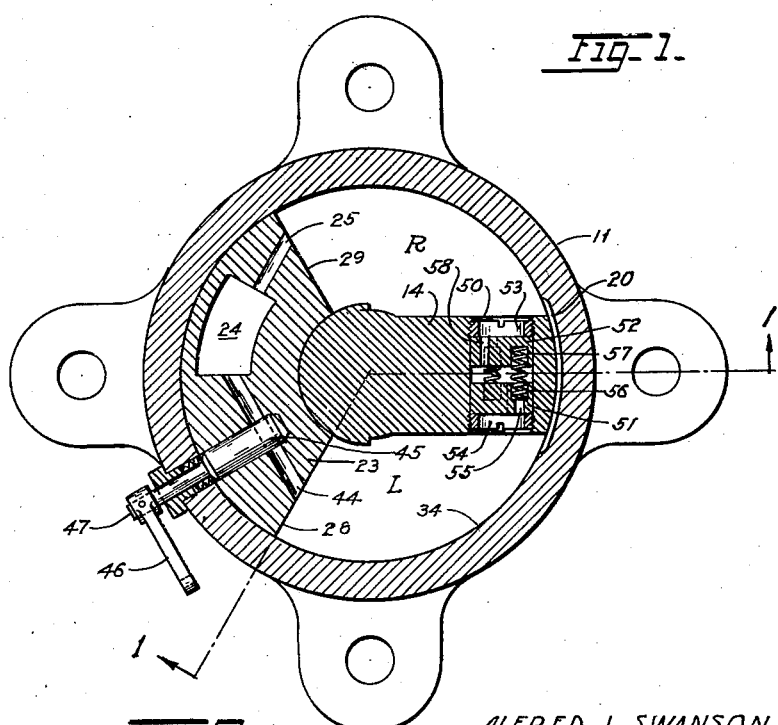
Fig. 2 is a cross-section taken on the line 2—2 of Fig. 1.
Figure 7:
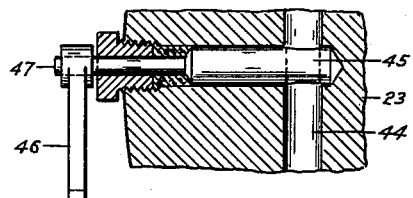
Fig. 7 shows an enlarged sectional view of the release valve.
Figure 8:
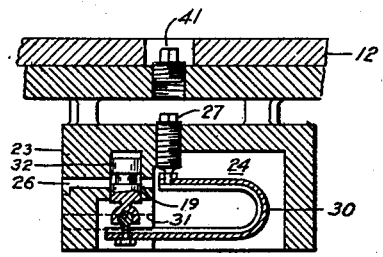
Fig. 8 is a partial section taken on the line 8—8 of Fig. 4.
Figure 9:
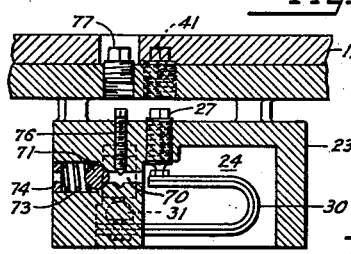
Fig. 9 is a partial section taken on the line 9—9 of Fig. 4.

Referring to the figures, in particular to Figs. 1 and 2, a casing and mounting base is represented generally by 11, with inside cylindrical side walls 34 which together with a top plate 12 defines the working chamber, which is normally filled with a liquid. A shaft 13 upon which is fastened the rotary reciprocative piston 14 rotates in the seat 22 in the base 11, and is journalled in the top plate 12, with packing means 36 held by the cap 37 closely around the shaft 13 at its upper end to prevent leakage of the liquid. The top plate 12 is held in place relative to the base by the threaded collar 35. The exterior portion of the shaft 13 is adapted to be attached to the movable aircoil member in its axis of revolution, for example, as by the flange 63 shown in Fig. 11.

In the form shown, the working chamber is limited to a segment of the complete cylindrical space defined by the side walls 34 and the side walls 28 and 29 of a fixed block 23 fixed to the base or cylindrical side wall. Wi hin the block 23 is a reservoir 24 which communicates with one portion R of the working chamber by a passageway 25 and with the other portion L of the working chamber by a release duct 44 wi h a valve 45 adapted to widely open or close it. The valve 45 is operable from outside the casing 11, for example, as shown by the lever arm 46 attached to the valve shaft 47. The lever arm 46 may be remotely controlled by lever couplings, or cables, or other suitable means. The release duct 44 is made large enough so that when the valve 45 is opened, the checking mechanism of my hinge device is rendered completely inoperative, and the device serves then merely as a hinge or bearing.

The piston 14 is provided with an aperture 50 extending from one working face to the other, which serves as a cylinder, in which are provided two floating pistons 51 and 52, re'ained by apertured retainers 53 and 54 adjustably fastened in the cylinder ends by threading or otherwise.

Space is provided for lengthwise movement of the pistons 51 and 52 whose distance of travel may be varied by adjusting the retainers 53 and 54. The piston 51 is provided with holes 55 therethrough, the ends adjacent the other piston 52 being enlarged to hold small coil springs 56, the other ends of which are conveniently held in similarly placed holes 57 in piston 52, but not through it. Openings 58 are provided through the piston 52, staggered or offset in relation to the holes 55 in piston 51. The springs 56 normally keep the floating pistons a short distance apart, so that the liquid in the working chamber may flow freely through the holes 55 and 58 of pistons 51 and 52, and through the apertures in the retainers 53 and 54, thereby allowing nearly unrestricted passage of liquid to and from the right and left portions of the working chamber.

At a selected position on the sliding contact area of the piston on the base or the cylindrical side wall is cut a by-pass groove 20. As shown, this is in the cylindrical wall 34 at the center of the piston movement, and in length is a little greater than the width of the piston 14. The length of this groove determines the angle of unrestricted turning of the hinge and of the movable airfoil member mounted on it, since the by-pass groove allows free movement of liquid around the rotary piston from one part of the working chamber to the other.

In Figs. 3 and 4 is shown a modified form of my invention in which two additional outlet ducts 26 and 70 are provided from the reservoir 24 to the left hand side of the working chamber, one of these being thermostatically controlled to compensate for changes in the viscosity of the fluid used in the working chamber, and the other being a one-way duct with an adjustable valved opening. This form of my invention is necessary where a constant checking effect is desired on the turning movement of the shaft, except in the portion relieved by the by-pass groove.

Interposed in the duct 26 is an orifice 19 whose opening is controlled by the hand adjustment screw 27 which is adapted to raise and lower the position of the U-shaped thermostatic element 30 which in turn through the ball and socket joint 31 controls the position of the grooved cylinder 32 in its seat 33. Removal of plug 41 from the cover plate 12 gives access to the head of the screw 27. The bi-metallic thermostatic element 30 by expanding and contracting with the rise and fall of the temperature of the liquid in the reservoir automatically restricts the orifice 19 more when the temperature is higher, thus compensating for the change in rate of flow of liquid through the orifice due to changes in viscosity with temperature. The other duct 70 from the reservoir 24 to the left hand side L of the working chamber is provided with a check valve consisting of a ball 71 held in its seat 72 by a light spring 73 and retainer 74. The size of the opening of this duct 70 is controlled by the hand operated needle valve 76 which may be manipulated through the opening in the cover plate 12 by the removal of the plug 77. This one-way duct 70 and hand adjustable valve 76 permits regulation of the amount of liquid passing from the reservoir to the left hand portion of the working chamber, whereas in the movement of liquid in the opposite direction, no liquid passes through this duct, but only through the orifice. This arrangement permits compensating adjustments for the differing amounts of liquid under compression in going from left to right and from right to left. It also permits definitely selected unequal checking actions in the two directions. The remainder of the structure is similar to that described for Figs. 1 and 2.

Figures 10, 11:
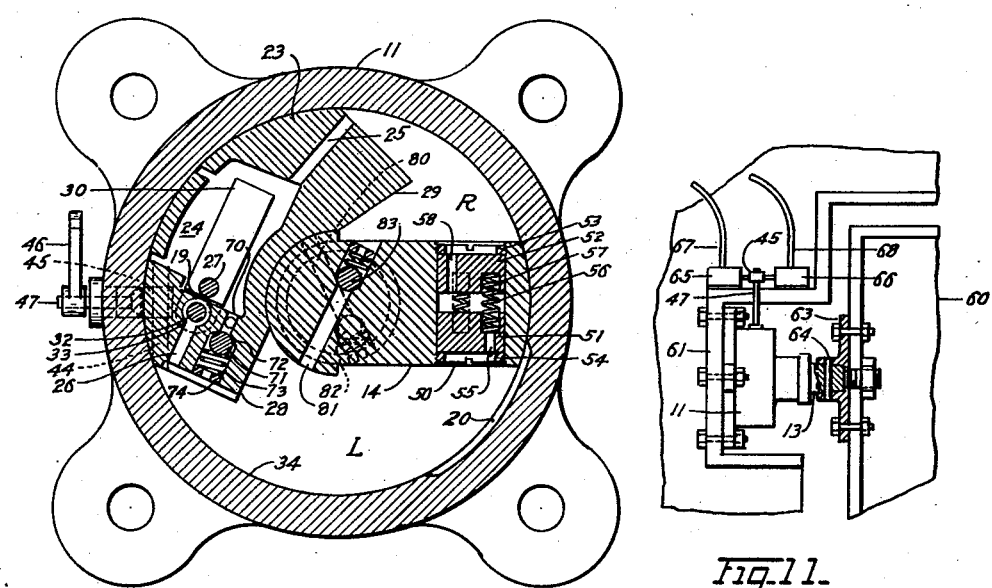
Fig. 10 shows in elevation and partly in section another form of my invention.
Fig. 11 shows in plan view with parts broken away, my hinge device in use in mounting a movable airfoil.

The use of my anti-flutter hinge device in mounting the movable airfoil 60 of an airplane is shown in Fig. 11. The hinge is attached to a structural member 61 of the body or wing of an airplane, the shaft 13 being aligned with the axis of the movable airfoil 60, and attached to a structural member 62 thereof by the flange 63 which is fastened to the shaft 13, as by the keypin 64. The extended shaft 47 of the release valve 45 is operatively linked by the lever 46 to piston and cylinder means represented by 65 and 68 from a remote control source. During normal flight, the release duct 44 is closed. It is opened only when taking off or landing, or when no checking effect in the hinge is required; and when quick movements may be required in manipulating the plane. At the beginning of any sudden movement of the movable airfoil 60, the shaft 13 will be rotated a little because the by-pass groove 20 allows the liquid in the working chamber of my device to flow freely from one side to the other. When the piston 14 has moved so that one edge is to the right, for example, beyond the groove 20, hydraulic pressure is suddenly built up because the ducts 26 and 70 are constricted. The sudden movement and increase of liquid pressure causes the floating pistons 51 and 52 to collapse together against the action of the springs 56 which normally tend to keep them apart. This constricts the passage of fluid between their adjacent faces in the circuitous path from the holes 51 to 52, and the sudden movement is checked before it has progressed very far, thus preventing the airfoil from fluttering. As soon as the sudden movement in the first direction has been checked, as described, the floating pistons 51 and 52 are again separated by the springs 56 and the liquid freely flows from one side of the working chamber to the other. If a sudden reverse movement then occurred, the floating pistons 51 and 52 would again collapse together to restrict the flow of liquid and the movement would be soon checked.

The relatively slow movements of the movable airfoil members which are employed for controlling the airplane in flight do not cause the floating pistons to collapse together and thereby they do not interpose any substantial resistance to movement. The slow movements are restricted only by the resistance of the liquid in going through the orifices in the floating pistons of the device of Figs. 1 and 2, and through these and the orifices in the ducts 26 and 70 in the modified structure shown in Figs. 3, 4, 8 and 9. The ducts 26 and 70 are adjustable through the valves 32 and 76 respectively, and because the duct 70 allows flow in one direction only, the combined effective resistance to flow of the fluid may be independently adjusted for the two directions. This feature is useful in compensating for variatoins in the load in the two directions. The thermostat arrangement equalizes the resistance to flow due to changes in viscosity with temperature.

Another modification of my device is shown in Fig. 10, the general arrangement being the same as above described for Figs. 3 and 4, with the addition of two check valves through the shaft 13 of the piston 14 which permit a reverse movement of the movable airfoil by the pilot during or immediately following a sudden movement such as the beginning of "fluttering," even though the piston is not on the center by-pass groove. Two holes 80 and 81 are provided through the shaft, one end of each being alternatively sealed off by the shaft contact on the fixed block 23 when the piston is to the right or to the left of by-pass groove 20. The other ends of the two holes terminate in the right and left portions of the working chamber and are provided with ball check valves 82 and 83.

The advantage of my hydraulically checked hinge device will be apparent to those familiar with this art, and its use for mounting and controlling movable airfoil parts adds to the safety of airplane operation.

While I have shown preferred forms of my device, I do not wish to limit my invention to the particular forms shown, but restrict it only insofar as required by the prior art and the spirit of the appended claims.

I claim:

1. An airfoil hinge including a shaft, bearings for the shaft, and hydraulic friction means adapted to impose varied degrees of resistance to rotation of said shaft in said bearings in selected angular zones of rotation, said friction means comprising an hydraulic working chamber structure supporting said bearings for the shaft, a rotary piston on said shaft operative within a working chamber, an opening through said rotary piston from one side of the working chamber to the other, a pair of inertia pistons with offset orifices therethrough movable within said opening in the rotary piston, spring means for normally holding said inertia pistons in position permitting free flow of hydraulic liquid therethrough, and a valved duct for conveying hydraulic liquid around said rotary piston.

2. An airfoil hinge including a shaft, bearings for the shaft, and hydraulic friction means adapted to impose varied degrees of resistance to rotation of said shaft in said bearings in selected angular zones of rotation, said friction means comprising an hydraulic working chamber structure supporting said bearings for the shaft, a working chamber in said structure having a rotary piston contacting surface, a rotary piston on said shaft operative within said working chamber, an opening through said rotary piston from one side of the working chamber to the other, a pair of inertia pistons with offset orifices therethrough movable within said opening in the rotary piston, spring means for normally holding said inertia pistons in position permitting free flow of hydraulic liquid therethrough, a valved duct for conveying hydraulic liquid around said rotary piston, and a groove in the rotary piston contacting surface of said working chamber for by-passing liquid around said piston in a central working zone.

3. An airfoil hinge including a shaft, bearings for the shaft, and hydraulic friction means adapted to impose varied degrees of resistance to rotation of said shaft in said bearings in selected angular zones of rotation, said friction means comprising an hydraulic working chamber structure supporting said bearings for the shaft, a working chamber in said structure, a rotary piston on said shaft operative within said working chamber, an opening through said rotary piston from one side of the working chamber to the other, a pair of inertia pistons with offset orifices therethrough movable within said opening in the rotary piston, spring means for normally holding said inertia pistons in position permitting free flow of hydraulic liquid therethrough, a valved duct for conveying hydraulic liquid around said rotary piston, and valve means to at times nullify the hydraulic friction in all zones of rotation.

4. An airfoil hinge including a shaft, bearings for the shaft, and hydraulic friction means adapted to impose varied degrees of resistance to rotation of said shaft in said bearings in selected angular zones of rotation, said friction means comprising an hydraulic working chamber structure supporting said bearings for the shaft, a working chamber in said structure, a rotary piston on said shaft operative within said working chamber, an opening through said rotary piston from one side of the working chamber to the other, a pair of inertia pistons with offset orifices therethrough movable within said opening in the rotary piston, spring means for normally holding said inertia pistons in position permitting free flow of hydraulic liquid therethrough, a valved duct for conveying hydraulic liquid around said rotary piston, a groove in the rotary piston contacting surface of said working chamber for by-passing liquid around said piston in a central working zone, and valve means to at times nullify the hydraulic friction in all zones of rotation.

5. An airfoil hinge including a shaft, bearings for the shaft, and hydraulic friction means adapted to impose varied degrees of resistance to rotation of said shaft in said bearings in selected angular zones of rotation, said friction means comprising an hydraulic working chamber structure supporting said bearings for the shaft, a working chamber in said structure, a rotary piston on said shaft operative within said working chamber, an opening through said rotary piston from one side of the working chamber to the other, a pair of inertia pistons with offset orifices therethrough movable within said opening in the rotary piston, spring means for holding said inertia pistons in position permitting free flow of hydraulic liquid therethrough, a reservoir for liquid, a duct communicating from one side of the working chamber with said reservoir, and an adjustable thermostatically controlled orifice and also a check valved duct communicating between said reservoir and said other side of the working chamber.

6. A hinge including a shaft, bearings for the shaft, and hydraulic checking means adapted to control the turning of said shaft, said checking means comprising an hydraulic working chamber, a rotary piston mounted on said shaft for turning in said hydraulic working chamber, a pair of inertia pistons having offset openings in a duct leading through said rotary piston, and spring means for normally holding said inertia pistons apart to allow substantially unrestricted flow of liquid through the openings and between the two pistons in passage through the rotary piston from one side of the working chamber to the other.

7. A hinge including a shaft, bearings for the shaft and hydraulic friction means adapted to control the turning of said shaft, said checking means comprising an hydraulic working chamber, a rotary piston mounted on said shaft for turning in said hydraulic working chamber, a pair of inertia pistons having offset openings in a duct leading through said rotary piston, spring means for normally holding said inertia pistons apart to allow substantially unrestricted flow of liquid through the openings and between the two pistons in passage through the rotary piston from one side of the working chamber to the other, and valve controlled passages for liquid around said rotary piston adapted to impose hydraulic friction on the rotary piston when the inertia pistons close the duct through said rotary piston.

8. A hinge including a shaft, bearings for the shaft, and hydraulic friction means adapted to control the turning of said shaft, a valved release duct for at times nullifying said friction means effective or ineffective by manual control outside said hinge, said checking means comprising an hydraulic working chamber, a rotary piston mounted on said shaft for turning in said hydraulic working chamber, a pair of inertia pistons having offset openings in a duct leading through said rotary piston, spring means for normally holding said inertia pistons apart to allow substantially unrestricted flow of liquid through the openings and between the two pistons in passage through the rotary piston from one side of the working chamber to the other.

9. A hinge including a shaft, bearings for the shaft, and hydraulic friction means adapted to control the turning of said shaft, a valved release duct for at times nullifying said friction means, said friction means comprising an hydraulic working chamber, a rotary piston mounted on said shaft for turning in said hydraulic working chamber, a pair of inertia pistons having offset openings in a duct leading through said rotary piston, spring means for normally holding said inertia pistons apart to allow substantially unrestricted flow of liquid through the openings and between the two pistons in passage through the rotary piston from one side of the working chamber to the other, and valve controlled passages for liquid around said rotary piston adapted to impose hydraulic friction on the rotary piston when the inertia pistons close the duct through said rotary piston.

10. A hinge including a shaft, bearings for the shaft, and hydraulic friction means adapted to control the turning of said shaft, said friction means comprising an hydraulic working chamber having a rotary piston contacting surface, a rotary piston mounted on said shaft for turning in said hydraulic working chamber, a pair of inertia pistons having offset openings in a duct leading through said rotary piston, spring means for normally holding said inertia pistons apart to allow substantially unrestricted flow of liquid through the openings and between the two pistons in passage through the rotary piston from one side of the working chamber to the other, and a groove in the rotary piston contacting surface of said working chamber for by-passing liquid around said piston through a central portion of its possible travel.

11. A hinge including a shaft, bearings for the shaft and hydraulic friction means adapted to control the turning of said shaft, said friction means comprising an hydraulic working chamber having a rotary piston contacting surface, a rotary piston mounted on said shaft for turning in said hydraulic working chamber, a pair of inertia pistons having offset openings in a duct leading through said rotary piston, spring means for normally holding said inertia pistons apart to allow substantially unrestricted flow of liquid through the openings and between the two pistons in passage through the rotary piston from one side of the working chamber to the other, valve controlled passages for liquid around said rotary piston adapted to impose hydraulic friction on the rotary piston when the inertia pistons close the duct through said rotary piston, and a groove in the rotary-piston-contacting surface of said hydraulic working chamber for by-passing liquid around said piston through a central portion of its possible travel.

12. A hinge including a shaft, bearings for the shaft, and hydraulic friction means adapted to control the turning of said shaft, said friction means comprising an hydraulic working chamber having a rotary piston contacting surface, a rotary piston mounted on said shaft for turning in said hydraulic working chamber, a pair of inertia pistons having offset openings in a duct leading through said rotary piston, spring means for normally holding said inertia pistons apart to allow substantially unrestricted flow of liquid through the openings and between the two pistons in passage through the rotary piston from one side of the working chamber to the other, a groove in the rotary piston contacting surface of said working chamber for by-passing liquid around said piston through a central portion of its possible travel, and two check-valved holes through said shaft adjacent the rotary piston one being adapted to permit free flow of liquid from the left portion of the working chamber to the right portion when the rotary piston is to the right of said groove, and the other being adapted to permit free flow of liquid from the right portion of the working chamber to the left portion when the rotary piston is to the left of said groove.

13. A hinge including a shaft, bearings for the shaft and hydraulic friction means adapted to control the turning of said shaft, said friction means comprising an hydraulic working chamber, having a rotary piston contacting surface, a rotary piston mounted on said shaft for turning in said hydraulic working chamber, a pair of inertia pistons having offset openings in a duct leading through said rotary piston, spring means for normally holding said inertia pistons apart to allow substantially unrestricted flow of liquid through the openings and between the two pistons in passage through the rotary piston from one side of the working chamber to the other, valve controlled passages for liquid around said rotary piston adapted to permit a restricted movement of the rotary piston when the inertia pistons close the duct through said rotary piston, a groove in the rotary piston contacting surface of said working chamber for by-passing liquid around said piston through a central portion of its possible travel, and two check-valved holes through said shaft adjacent the rotary piston, one being adapted to permit free flow of liquid from the left portion of the working chamber to the right portion when the rotary piston is to the right of said groove, and the other being adapted to permit free flow of liquid from the right portion of the working chamber to the left portion when the rotary piston is to the left of said groove.

14. An airfoil hinge including a shaft, bearings for the shaft, and hydraulic friction means adapted to impose varied degrees of resistance to rotation of said shaft in said bearings in selected angular zones of rotation said fricton means comprising an hydraulic working chamber structure supporting said bearings for the shaft, a rotary piston on said shaft operative within a working chamber, an opening through said rotary piston from one side of the working chamber to the other, a pair of inertia pistons with offset orifices therethrough movable within said opening in the rotary piston and means for normally holding said inertia pistons in position permitting free flow of hydraulic liquid therethrough.

ALFRED J. SWANSON.